United States Patent
Hepler

(10) Patent No.: US 7,248,698 B2
(45) Date of Patent: Jul. 24, 2007

(54) SYSTEM FOR GENERATING PSEUDORANDOM SEQUENCES

(75) Inventor: Edward L. Hepler, Malvern, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 799 days.

(21) Appl. No.: 10/046,601

(22) Filed: Oct. 23, 2001

(65) Prior Publication Data

US 2002/0196936 A1 Dec. 26, 2002

Related U.S. Application Data

(60) Provisional application No. 60/282,349, filed on Apr. 6, 2001.

(51) Int. Cl.
*H04L 9/00* (2006.01)
*H04K 1/00* (2006.01)
*H04J 11/00* (2006.01)

(52) U.S. Cl. .................. 380/268; 380/270; 370/209
(58) Field of Classification Search ................ 380/268, 380/38, 270; 370/203, 209
See application file for complete search history.

(56) References Cited

U.S. PATENT DOCUMENTS

| | | | |
|---|---|---|---|
| 5,311,176 A | 5/1994 | Gurney | |
| 5,602,833 A | 2/1997 | Zehavi | |
| 5,751,761 A * | 5/1998 | Gilhousen | ................... 375/146 |
| 6,014,408 A | 1/2000 | Naruse et al. | |
| 6,091,757 A | 7/2000 | Cudak et al. | |
| 6,115,410 A * | 9/2000 | Naruse | ........................ 375/130 |
| 6,262,751 B1 * | 7/2001 | Chan | ........................... 345/572 |
| 6,552,996 B2 * | 4/2003 | Kim et al. | ................... 370/209 |
| 6,567,017 B2 * | 5/2003 | Medlock et al. | ............... 341/50 |
| 6,646,579 B2 * | 11/2003 | Doetsch et al. | ............... 341/96 |
| 6,747,947 B2 * | 6/2004 | Kim et al. | ................... 370/209 |
| 6,798,737 B1 * | 9/2004 | Dabak et al. | ............... 370/209 |
| 6,850,238 B2 | 2/2005 | Bryant et al. | |
| 6,879,576 B1 * | 4/2005 | Agrawal et al. | ........... 370/342 |
| 6,885,691 B1 * | 4/2005 | Lyu | .............................. 375/130 |
| 2003/0105532 A1 * | 6/2003 | Doetsch et al. | ................. 700/1 |

FOREIGN PATENT DOCUMENTS

WO 01/58070 8/2001

OTHER PUBLICATIONS

Kung, VLSI Array Processors, pp. 436-438, 1988.
Kung, "VLSI Array Processors", 1998, pp. 436-438.

* cited by examiner

*Primary Examiner*—Syed A. Zia
*Assistant Examiner*—Kaveh Abrishamkar
(74) *Attorney, Agent, or Firm*—Volpe and Koenig, P.C.

(57) ABSTRACT

A system for generating pseudorandom codes using a register which contains an identification of the code tree leg of the desired code and a counter which outputs a successive binary sequence. The output from the counter is bit-by-bit ANDed with the output of the register, and those outputs are XORed together to output a single bit. As the counter is sequenced, each count results in a different bit that is output from the XOR gate, resulting in the desired code.

5 Claims, 6 Drawing Sheets

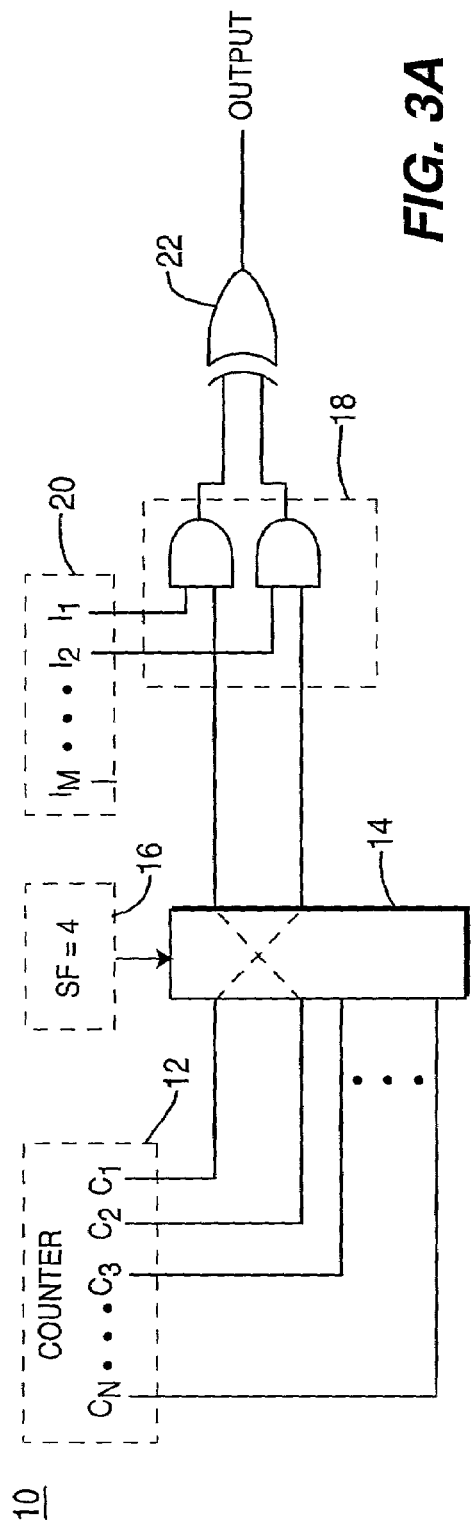
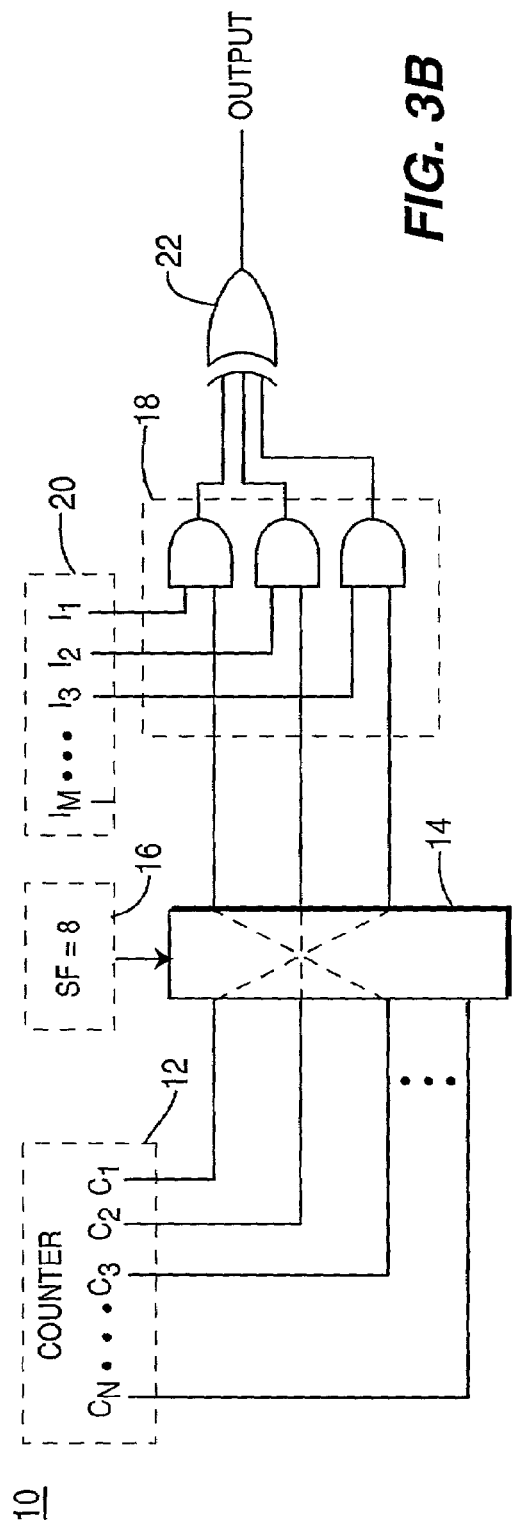

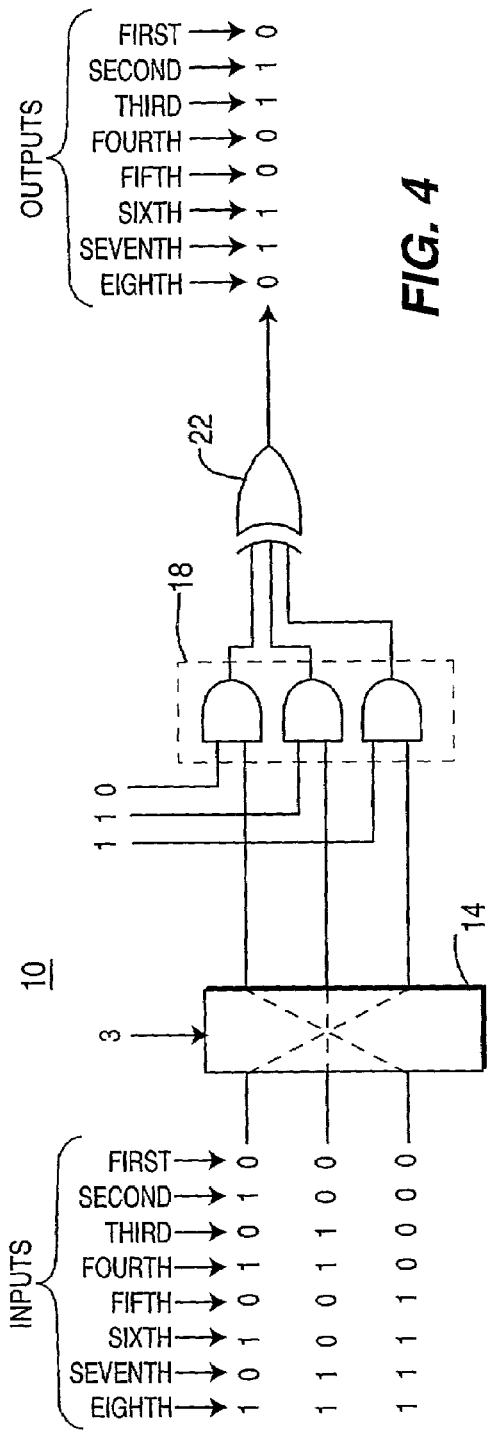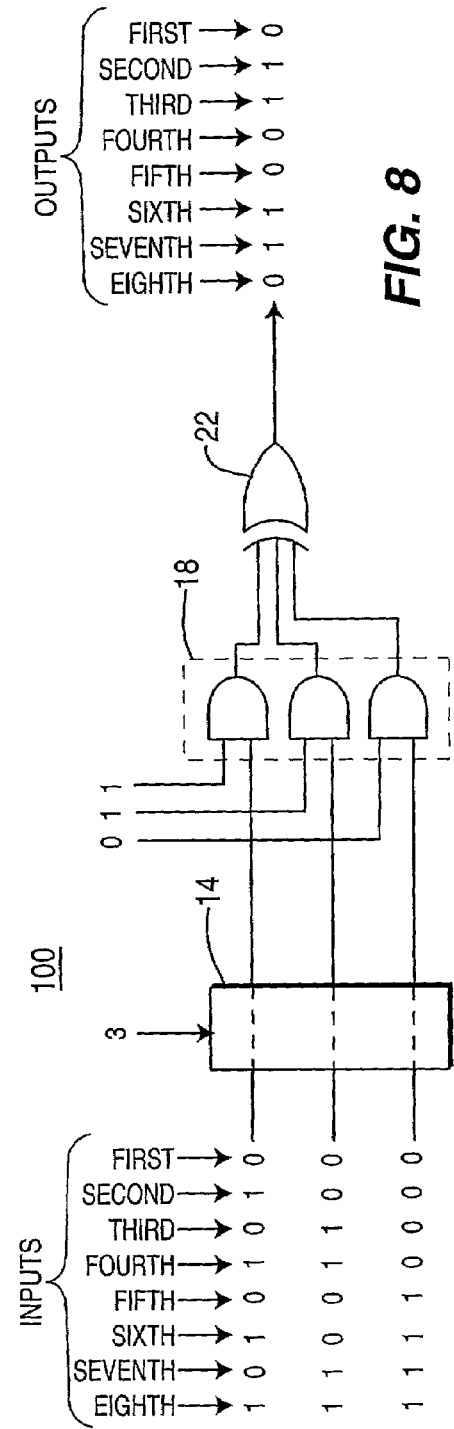

SYSTEM FOR GENERATING PSEUDORANDOM SEQUENCES

CROSS REFERENCE TO RELATED APPLICATIONS

This application claims priority from Provisional Patent Application No. 60/282,349, filed on Apr. 6, 2001.

BACKGROUND

The present invention generally relates to wireless communication systems. In particular, the invention relates to time division duplex (TDD) and frequency division duplex (FDD) systems which use orthogonal variable spreading factor (OVSF) codes and Hadamard codes to spread data for transmission and includes an improved system for generating such codes.

Many types of communication systems, such as FDD and TDD communication systems, use one or more families of pseudorandom codes to spread data for transmission. These codes are used in various places throughout the communication system in both the transmitter and the receiver. Several of the more commonly used families of codes include OVSF codes and Hadamard codes.

FIG. 1 shows a code tree of OVSF codes that preserve the orthogonality between different channels. The OVSF codes can be defined using the code tree of FIG. 1, whereby the channelization codes are uniquely described as $C_{ch,SF,k}$, and where SF is the spreading factor of the code and k is the code number $0 \leq k \leq SF-1$. Each level in the code tree defines channelization codes of length SF, corresponding to a spreading factor of SF in FIG. 1.

The generation method for the channelization code is defined as:

$$c_{ch,1,0} = 1,$$

$$\begin{bmatrix} c_{ch,2,0} \\ c_{ch,2,1} \end{bmatrix} = \begin{bmatrix} c_{ch,1,0} & c_{ch,1,0} \\ c_{ch,1,0} & -c_{ch,1,0} \end{bmatrix} = \begin{bmatrix} 1 & 1 \\ 1 & -1 \end{bmatrix}$$

$$\begin{bmatrix} C_{ch,2(n+1),0} \\ C_{ch,2(n+1),1} \\ C_{ch,2(n+1),2} \\ C_{ch,2(n+1),3} \\ \vdots \\ C_{ch,2(n+1),2(n+1)-2} \\ C_{ch,2(n+1),2(n+1)-1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix}$$

The rightmost value in each channelization code word corresponds to the chip transmitted first in time. The OVSF code to be used is a function of the spreading factor, the number of channels being utilized and the channel type.

One method for generating OVSF codes is to utilize the mathematical description above. However, such matrix manipulations are computationally expensive and require extremely fast and expensive hardware to perform. Additionally, when a computational unit is fixed in hardware for such a purpose, it generally cannot be utilized for other purposes. This adds to system complexity and results in an overall system design that is unnecessarily complex and expensive.

Accordingly, a convenient means is needed to quickly and efficiently generate OVSF codes. It would also be desirable for such means to be adaptable to the generation of other types of codes, such as Hadamard sequences.

SUMMARY

The present invention comprises both a system and a method which quickly and efficiently generate OVSF codes using a register which contains the identification of code tree leg of the desired code and a counter which sequences through the leg. The system generates the codes on demand, while requiring very little hardware resources.

Additionally, the same system and method are adaptable to generate Hadamard sequences.

BRIEF DESCRIPTION OF THE DRAWINGS

FIG. 3A is a system for generating OVSF codes having a spreading factor of 4.

FIG. 3B is a system for generating OVSF codes having a spreading factor of 8.

FIG. 4 illustrates the generation of the seventh code of the OVSF code tree having a spreading factor of 8.

FIG. 8 illustrates the generation of the forth code of the Hadamard code tree having a spreading factor of 8.

DETAILED DESCRIPTION OF THE PREFERRED EMBODIMENTS

Figure 1:
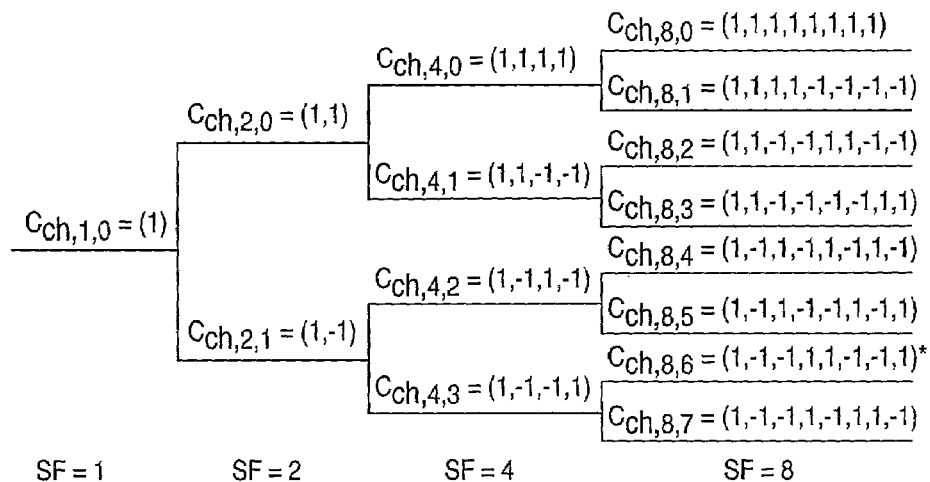
FIG. 1 is a prior art code tree for orthogonal variable spreading factor (OVSF) codes.

Presently preferred embodiments are described below with reference to the drawing figures wherein like numerals represent like elements throughout. Additionally, the preferred embodiment of the present invention will be explained with reference to the generation of OVSF and Hadamard codes. However, those of skill in the art should realize that the same principles may be applied to other families of codes, and the present invention should not be strictly limited to the exemplary embodiments described herein.

Figure 2:
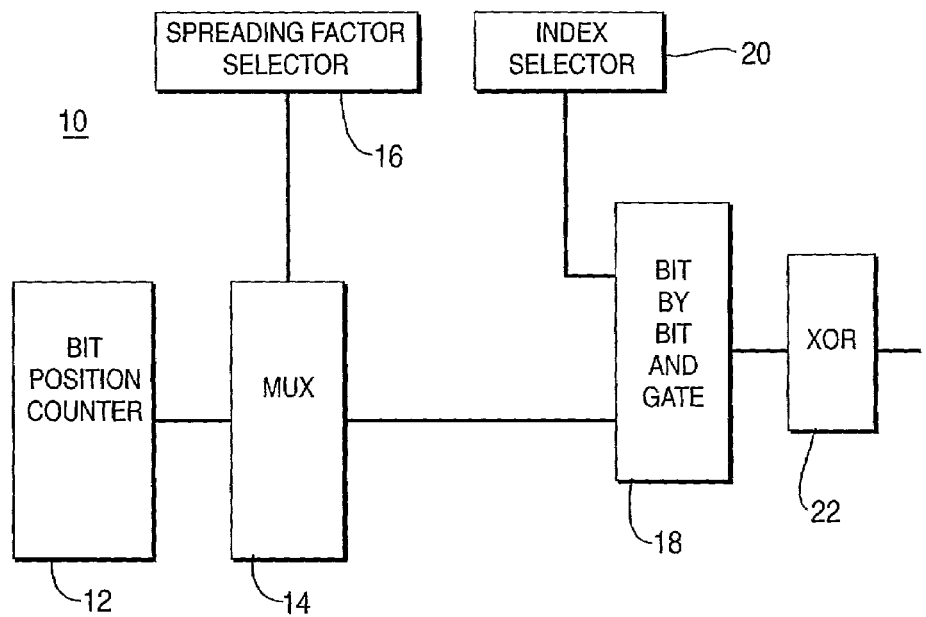
FIG. 2 is a system for generating OVSF codes in accordance with the present invention.

Referring to FIG. 2, a system 10 for generating pseudorandom sequences is shown. The system 10 includes a bit position counter 12, a multiplexer 14, a spreading factor selector 16, a bit-by-bit AND gate 18, an index selector 20 and an XOR gate 22. The counter 12 is a free-running binary counter that provides an output to a first input of the multiplexer 14. The counter 12 is initialized at 0 and runs "freely" as the desired OVSF code is generated. Generation of a code is repeated as many times as needed in order to spread the data. For each instance that it is required to generate the code, the counter is initialized to zero. Alternatively, the counter 12 may be permitted to freely run, whereby the most significant bits that are not used may be ignored. This alternative will be explained in detail hereafter.

The spreading factor selector 16 provides an output to the second input of the multiplexer 14, which identifies how many bits from the counter 12 the multiplexer 14 should output. For OSVF code generation, the multiplexer 14 also reverses the bit order of the output bits, such that the output bits are provided in reverse order. This is graphically illustrated by the dotted lines within the multiplexer 14 in FIGS. 3A and 3B.

Referring back to FIG. 2, the index selector 20 outputs a binary identification of the index or "branch" of the code tree that it is desired to generate. For example, as shown in FIG. 1, if a spreading factor of 4 is desired, and it is also desired to generate the third branch of the code tree, the index selector 20 will output a two-bit binary sequence for the number 2, which is 10. Similarly, if a spreading factor of 8 and the fourth branch of the code tree are desired, the index selector 20 outputs a three-bit binary sequence for the number 3, which is 11.

The output of the index selector 20 and the output of the multiplier 14 are ANDed together by the bit-by-bit AND gate 18. This is an output to the XOR gate 22, which is actually an XOR "tree", comprising a plurality of XOR gates as is well known by those of skill in the art.

The system 10 in accordance with the present invention is shown in more detail in FIGS. 3A and 3B, which illustrate the different functional configurations of the system 10 depending upon the desired spreading factor. These figures show the multiple bit output $C_1$-$C_N$ from the counter 12 and the multiple bit output $I_1$-$I_M$ from the index selector 20. Referring to FIG. 3A, if a spreading factor of 4 is desired, the spreading factor selector 16 controls the multiplexer 14 such that the multiplexer 14 outputs only the desired bits coming from the first two bit "positions" $C_1$ and $C_2$ of the counter 12 to the AND gate 18. The bit positions $C_3$-$C_N$ coming from the counter 12 are essentially "zeroed out" or ignored. Each desired bit from the counter 12 is taken in reverse order and is bit-by-bit ANDed with the desired bits from the index selector 20. For example, the first bit $C_1$ from the counter 12 is ANDed together with the second bit $I_2$ from the index selector 20; and the second bit $C_2$ from the counter 12 is ANDed together with the first bit $I_1$ from the index selector 20. Once all of the desired bits from the counter 12 have been bit-by-bit ANDed with the desired bits from the index selector 20, the AND gate 18 outputs to the XOR gate 22. The output of the XOR gate 22 is the code sequence having the desired bits. Each new bit of the code sequence is generated as the counter 12 is sequenced.

Referring to the second example as shown in FIG. 3B, if a spreading factor of 8 is desired, the multiplexer 14 outputs the bits coming from the first three positions $C_1$, $C_2$ and $C_3$ of the counter 12 to the AND gate 18. The first bit $C_1$ from the counter 12 is ANDed together with the third output $I_3$ from the index selector 20. Likewise, the second bit from the counter $C_2$ is ANDed together with the second bit $I_2$ from the index selector 20. Finally, the third bit $C_3$ from the counter 12 is ANDed together with the first bit $I_1$ from the index selector 20. Once all of the desired bits from the counter 12 have been bit-by-bit ANDed with the desired bits from the index selector 20, the AND gate 18 outputs to the XOR gate 22. The output of the XOR gate 22 is the desired code sequence.

Although the system 10 made in accordance with the present invention can be used to generate codes having spreading factors of any length, for simplicity the foregoing detailed example will be explained with reference to a spreading factor of 8. This requires a three-bit spreading factor selector 16, a three-bit counter 12 to sequence through the bits, a three-input AND gate 18 and a three-input XOR gate 22 as shown in FIG. 4. Reference should also be made to Tables 1-3 below for this example:

TABLE 1

SPREADING FACTOR

| DESIRED SF | NUMBER OF BITS |
|---|---|
| 2 | 1 |
| 4 | 2 |
| 8 | 3 |
| 16 | 4 |
| 32 | 5 |
| 64 | 6 |
| 128 | 7 |
| 256 | 8 |

TABLE 2

INDEX

| BRANCH | $I_3$ | $I_2$ | $I_1$ |
|---|---|---|---|
| First | 0 | 0 | 0 |
| Second | 0 | 0 | 1 |
| Third | 0 | 1 | 0 |
| Fourth | 0 | 1 | 1 |
| Fifth | 1 | 0 | 0 |
| Sixth | 1 | 0 | 1 |
| Seventh | 1 | 1 | 0 |
| Eighth | 1 | 1 | 1 |

TABLE 3

COUNTER

| $C_3$ | $C_2$ | $C_1$ |
|---|---|---|
| 0 | 0 | 0 |
| 0 | 0 | 1 |
| 0 | 1 | 0 |
| 0 | 1 | 1 |
| 1 | 0 | 0 |
| 1 | 0 | 1 |
| 1 | 1 | 0 |
| 1 | 1 | 1 |

For this example, it is desired to generate a code sequence having a spreading factor of 8, comprising the seventh leg of the code tree shown in FIG. 1 as highlighted with the asterisk. This is identified in FIG. 1 as $C_{ch,8,6}$ which is 1, −1, −1, 1, 1, −1, −1, 1. From Table 1, since the desired spreading factor is 8, the number of desired bits is 3. From Table 2, since it is desired to generate the seventh branch of the code tree, the output of the index selector as shown in Table 2 will be the binary sequence 1, 1, 0. The binary counter 12 then sequences through a binary count from 0 (0, 0, 0) to 7 (1, 1, 1) as shown in Table 3.

The first bit of the sequence $C_{ch,8,6}$ will be generated by ANDing the binary sequence 000, (which when reversed still yields 000), from the counter 12 with the binary sequence 110 from the index selector 20. The XOR of the bits results in an output of 0. The second input of 001 is reversed yielding 100, and is ANDed with the binary sequence 110 from the index selector 20, resulting in 100. The XOR of these bits results in an output of 1. Likewise, the third input of 010 is reversed yielding 010 and when ANDed with 110 and XORed, results in an output of 1. The fourth input of 011 is reversed yielding 110 and when ANDed with 110 and XORed results in an output of 0. The fifth input of 100 is reversed yielding 001 and when ANDed with 110 and XORed results in the output of 0. The sixth input of 101 is reversed yielding 101 and when ANDed with 110 and XORed results in an output of 1. The seventh input of 110 is reversed yielding 011 and when ANDed with 110 and XORed in an output of 1. Finally, the eighth input of 111 is reversed yielding 111 and when ANDed with 110 and XORed results in an output of 0.

As a result of this repetitive process, the sequence output will be 0, 1, 1, 0, 0, 1, 1, 0, (keeping in mind the rightmost bit is generated first in time). These outputs are subsequently mapped, whereby an output of 1 is mapped to −1 and an output of 0 is mapped to 1. Accordingly, the sequence used for spreading is 1, −1, −1, 1, 1, −1, −1, 1. This matches the seventh leg of the OSVF code tree shown in FIG. 1.

Figure 5:
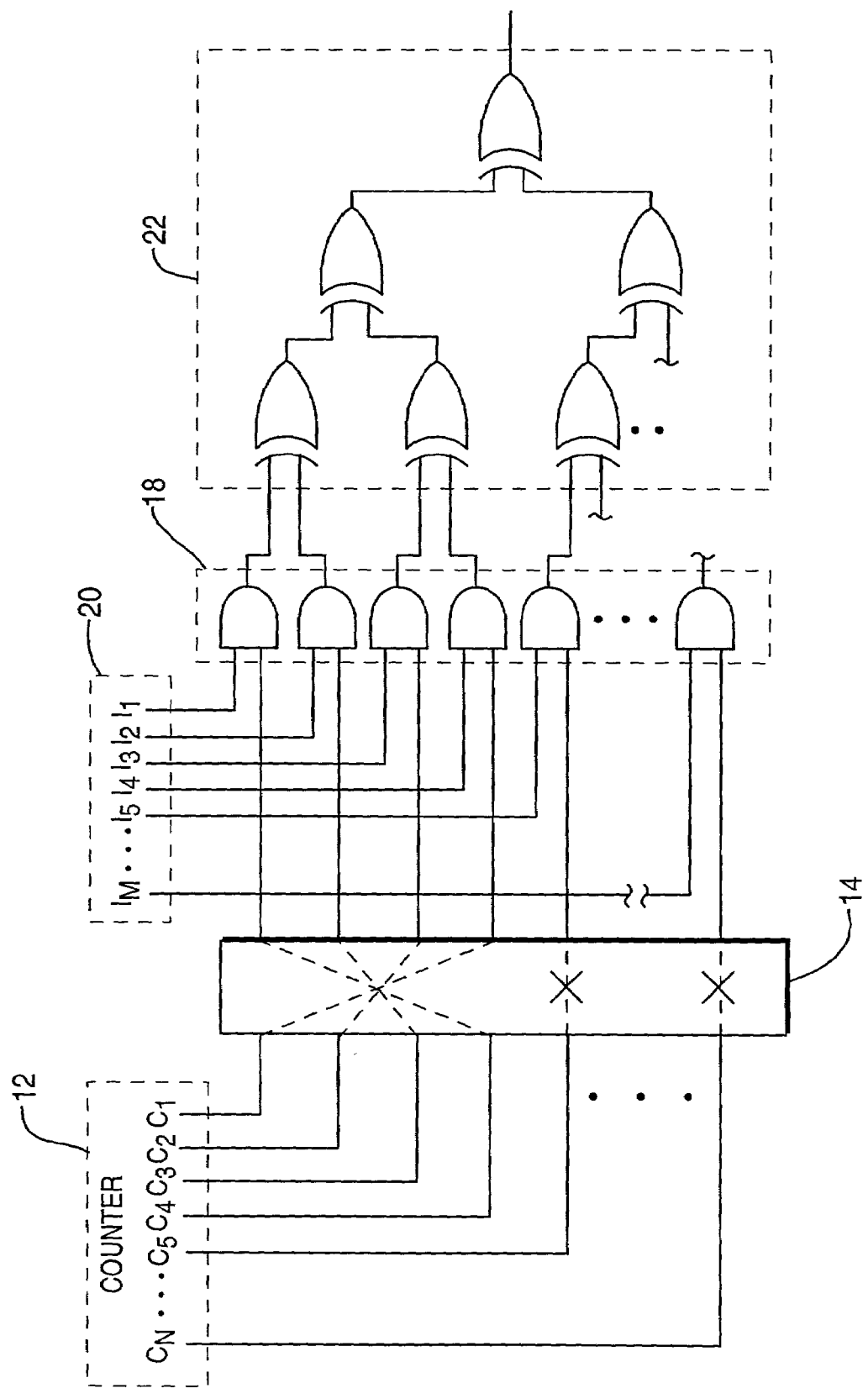
FIG. 5 is a diagram illustrating the expandability of the structure.

It should be noted, referring to FIG. 5, that this structure is expandable to any number of desired inputs. Alternatively, the system may be "oversized" as shown in FIG. 5 whereby the bits of the counter 12 and the index selector 20 that are not needed are essentially ignored. As shown in FIG. 5, since only four bits $C_1$-$C_4$ are required, bits $C_5$-$C_N$ are either stopped from passing through the multiplexer 14, or are zeroed out. Additionally, only the desired bits $C_1$-$C_4$ are reordered by the multiplexer 14. In a likewise matter only bits $I1$-$I4$ will be "processed" by the AND gate since the remaining portions of the AND gate will be zeroed out due to the lack of an input from corresponding bits $C_5$-$C_N$. The output form the XOR gate 22 will be the desired code sequence bit.

Figure 6:
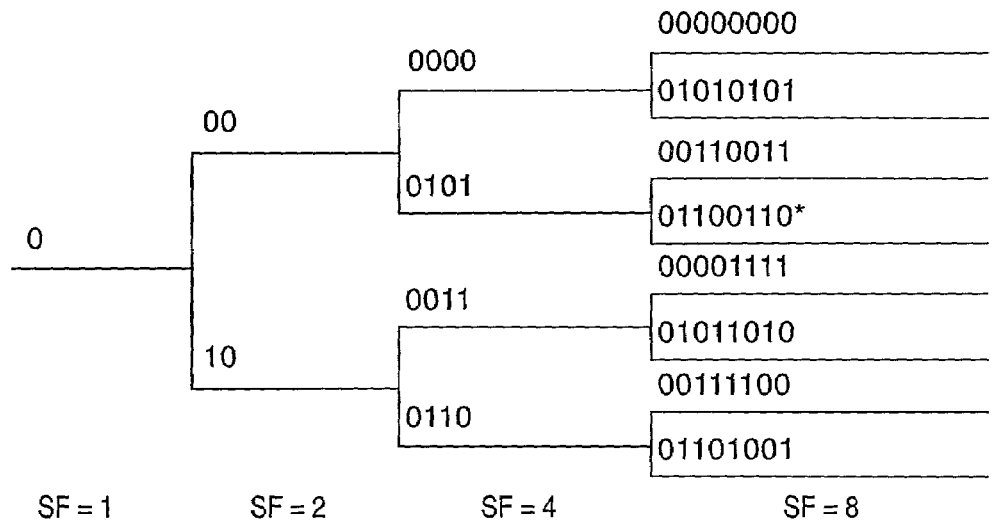
FIG. 6 is a prior art code tree for Hadamard codes.

Referring to FIG. 6, a code tree for Hadamard sequences is shown. The codes of this code tree will generated is accordance with an alternative embodiment of the present invention shown on FIG. 7.

Figure 7:
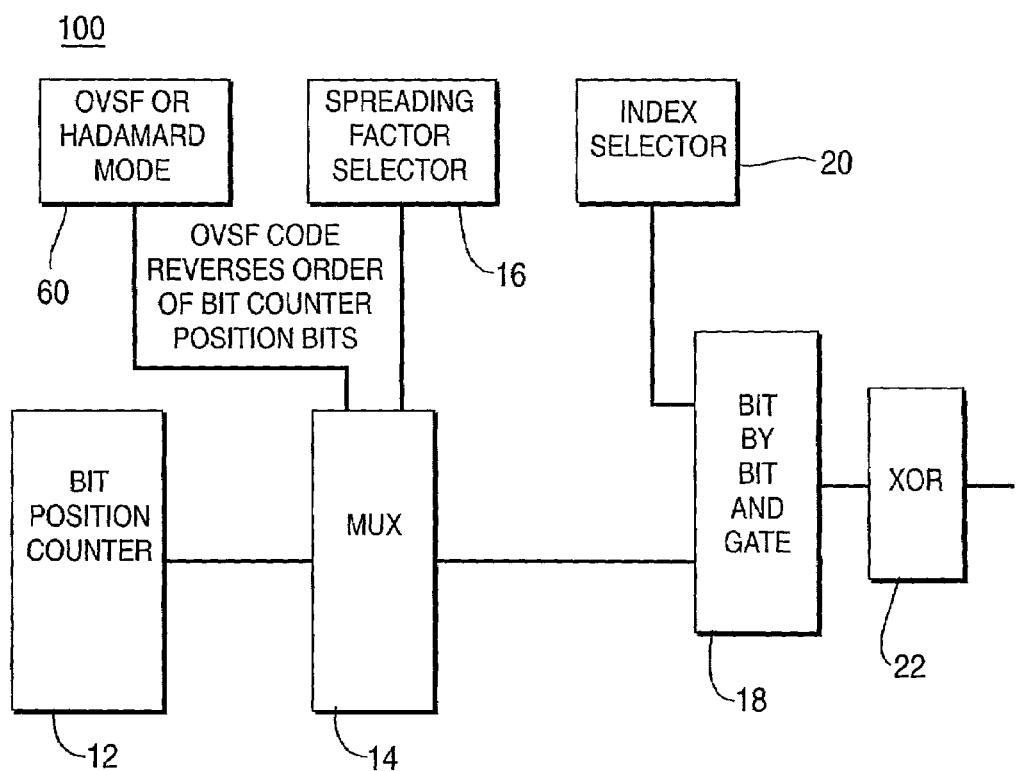
FIG. 7 is an alternative embodiment of the present invention for generating both Hadamard and OVSF codes.

Referring to FIG. 7, a system 100 for generating several types of pseudorandom sequences is shown. As with the embodiment shown in FIG. 2, the system 100 includes a bit position counter 12, a multiplexer 14, a spreading factor selector 16, a bit by bit AND gate 18, an index selector 20, and an XOR gate 22. However, this embodiment includes a mode switch 60 which switches between a first mode for generating OVSF codes and a second mode for generating Hadamard codes. When the mode selection switch 60 is in a first position, the system 100 operates in the manner identical to the system 10 shown in FIG. 2, whereby the multiplexer 14 reverses the bit order of the bit output from the bit position counter 12. However, when the mode switch 60 is in a second position, the reordering of the bits is not performed by the multiplexer 14 and the bits are passed directly through the multiplexer 14 to the bit by bit AND gate 18. This is shown in FIG. 8 whereby the straight dotted lines through the multiplexer 14 illustrate the bits being passed directly through the multiplexer 14 without being reordered.

An example of generating a Hadamard code will be explained with reference to FIG. 8. For this example, it is desired to generate a code sequence having a spreading factor of 8, comprising the fourth leg of the code tree as shown in FIG. 6 and as highlighted with the asterisk. This sequence is shown in FIG. 6 as 0,1,1,0,0,1,1,0. From Table 1, since the desired spreading factor is 8, the number of desired bits is 3. From Table 2, since it is desired to generate the fourth branch of the code tree, the output of the index selector as shown in Table 2 will be the binary sequence 0,1,1. The binary counter 12 then sequences through the binary count from 0 (0, 0, 0) to 7 (1, 1, 1) as shown in Table 3.

The same ANDing and XORing process is performed as was described with reference to the generation of the OVSF codes, except that the bits from the counter 12 are not reversed. This results in an output from the system 100 of 0, 1, 1, 0, 0, 1, 1, 0. This correctly matches the fourth leg of the Hadamard code prestructure shown in FIG. 6. These outputs may be optionally mapped whereby an output of 1 is mapped to minus 1 and an output of 0 is mapped to 1.

Figure 9:
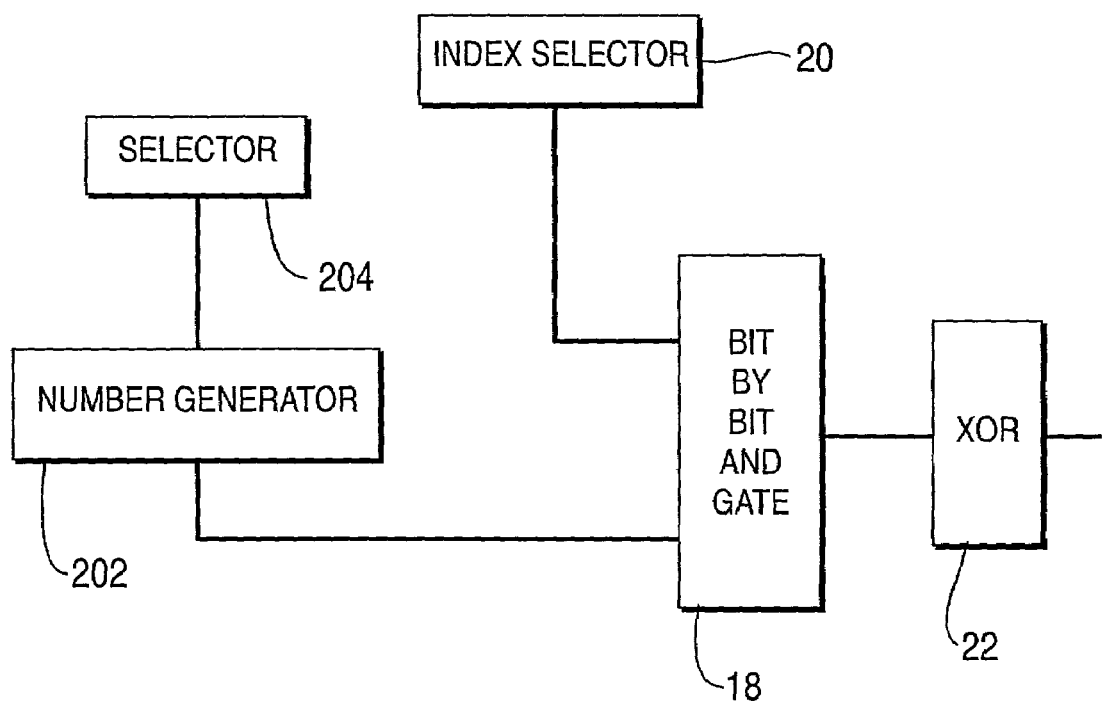
FIG. 9 is a second alternative embodiment of the present invention for generating pseudorandom codes.

A second alternative embodiment of a system 200 for generating several types of pseudorandom sequences is shown in FIG. 9. This system 200 includes the index selector 20, the bit by bit ANDgate 18 and the XOR 22. However, the bit position counter 12, the multiplexer 14 and the spreading factor selector 16 have been replaced by a number generator 202 and a selector 204. The number generator 202 stores a predetermined sequence of numbers, such as the numbers stored in Table 3, and sequentially outputs these numbers. Accordingly, the number generator 202 can sequentially output the numbers stored in Table 3, or alternatively may output the "reordered" sequence of bits as shown in Table 4. The selector 204 can select between which sequence of bits to be output by the number generator 202. For OVSF codes a first sequence will be output; and for Hadamard codes a second sequence will be output. Although this embodiment necessitates the use of additional memory, it is less memory than would be required to store an entire code tree of pseudorandom sequences. Additionally, although this embodiment has been explained with reference to pseudorandom codes having a spreading factor of 8, any desired sequence may be prestored in the number generator 202.

TABLE 4

| COUNTER | | |
|---|---|---|
| $C_3$ | $C_2$ | $C_1$ |
| 0 | 0 | 0 |
| 1 | 0 | 0 |
| 0 | 1 | 0 |
| 1 | 1 | 0 |
| 0 | 0 | 1 |
| 1 | 0 | 1 |
| 0 | 1 | 1 |
| 1 | 1 | 1 |

While the present invention has been described in terms of the preferred embodiment, other variations which are within the scope of the invention as outlined in the claims below will be apparent to those skilled in the art.

What is claimed is:

1. A system for generating an OVSF code comprising:
 a binary counter for providing a binary count comprising a plurality of sequential M-bit binary numbers, each binary number being ordered from most significant bit to least significant bit;
 bit reordering means, for selectively reordering the bits of each said binary number from least significant bit to most significant bit;
 an index selector, for providing an M-bit binary identification of said OVSF code; and
 a logical reduction means having a first input from the reordering means and a second input from the index selector and having an output; whereby the desired OVSF code is output from said output.

2. A code generator for generating individual binary codes of a set of binary codes, each binary code having $2^M$ bits, the code generator comprising:
 a counter having an output and sequentially outputting M-bit counts in a parallel orientation, each successive count being incremented by 1;

bit reordering means, coupled to said output of said counter, for receiving each M-bit count, whereby the M-bit counts are ordered from least significant bit to most significant bit, and whereby said bit reordering means reorders the bits from most significant bit to least significant bit;

an index selector for outputting an M-bit code identifier in a parallel orientation;

a parallel array of M logical gates, each having an output and a first input being one parallel bit from said bit ordering means and a second input being one parallel bit from said index selector; and a reduction network of logical gates associated with the outputs of said parallel array of logical gates for outputting a single code bit each time a parallel M-bit count is input to said parallel logical gate array from said bit ordering means, such that the binary code which is identified by the M-bit code identifier is produced after $2^M$ iterations.

3. A system for generating a desired pseudorandom code comprising:

a binary counter for providing a plurality of M-bit sequential binary numbers, each binary number being ordered from most significant bit to least significant bit;

bit reordering means for reordering the bits of said binary counter from least significant bit to most significant bit;

an index selector, for outputting an M-bit code identifier of the desired pseudorandom code;

at least M logical gates, each having a first input from said bit ordering means and a second input from said index selector, and each having an output; and an XOR tree for XORing said outputs of said logical gates to provide an XORed output; whereby the desired pseudorandom code is output from said XORed output.

4. A code generator for generating an individual binary code from a set of N binary codes, each binary code having M bits, the code generator comprising:

a counter having an output and sequentially outputting M-bit binary numbers, each successive binary number being incremented by 1;

bit reordering means, coupled to said output of said counter, for receiving each M-bit binary number having bits ordered from least significant bit to most significant bit, whereby said bit reordering means reorders the bits from most significant bit to least significant bit;

an index selector for outputting an M-bit code;

a logical gate array having a first input from said bit reordering means and a second input from said index selector, and having an output;

a reduction network of logical gates associated with said output of said logical gate array for outputting a single code bit each time an M-bit binary number is input to said logical gate array from said bit ordering means, such that the binary code identified by the M-bit code is produced after $2^M$ iterations.

5. The code generator of claim 4, further comprising a switch coupled to said bit reordering means, whereby when said switch is in a first position, said bit reordering means is coupled to said output of said counter to reorder the bits of said binary number, and when said switch is in a second position, said bit reordering means is decoupled from said output of said counter and the bits of said binary number are not reordered.

* * * * *

UNITED STATES PATENT AND TRADEMARK OFFICE
CERTIFICATE OF CORRECTION

| | | |
|---|---|---|
| PATENT NO. | : 7,248,698 B2 | Page 1 of 1 |
| APPLICATION NO. | : 10/046601 | |
| DATED | : July 24, 2007 | |
| INVENTOR(S) | : Edward L. Hepler | |

It is certified that error appears in the above-identified patent and that said Letters Patent is hereby corrected as shown below:

IN THE SPECIFICATION

Column 2, line 32, before the word "code", delete "forth" and insert therefor --fourth--.

Column 3, line 15, after the words "which is", delete "11" and insert therefor --011--.

Column 5, line 4, after "XORed", insert --results--.

Column 5, line 26, after the word "output", delete "form" and install therefor --from--.

Column 5, line 29, after the word "will", delete "generated is" and insert therefor --be generated in--.

Signed and Sealed this

Eighteenth Day of December, 2007

JON W. DUDAS
*Director of the United States Patent and Trademark Office*